United States Patent
Park et al.

(10) Patent No.: US 8,742,726 B2
(45) Date of Patent: Jun. 3, 2014

(54) SYSTEM AND METHOD FOR IDLE CHARGE OF HYBRID VEHICLE

(75) Inventors: Tae Wook Park, Seoul (KR); Jeongeun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 346 days.

(21) Appl. No.: 12/946,129

(22) Filed: Nov. 15, 2010

(65) Prior Publication Data

US 2012/0081070 A1 Apr. 5, 2012

(30) Foreign Application Priority Data

Sep. 30, 2010 (KR) .................. 10-2010-0095561

(51) Int. Cl.
*H02J 7/00* (2006.01)

(52) U.S. Cl.
USPC ....................................... 320/132

(58) Field of Classification Search
None
See application file for complete search history.

(56) References Cited

U.S. PATENT DOCUMENTS

| | | | | |
|---|---|---|---|---|
| 6,435,294 B1* | 8/2002 | Hara et al. | ........... | 180/65.25 |
| 2007/0075678 A1* | 4/2007 | Ng et al. | ........... | 320/106 |
| 2007/0262750 A1* | 11/2007 | Yun et al. | ........... | 320/132 |
| 2008/0157777 A1* | 7/2008 | Yamabe | ........... | 324/426 |

FOREIGN PATENT DOCUMENTS

| | | |
|---|---|---|
| JP | 07-284201 | 10/1995 |
| JP | 2000-134719 A | 5/2000 |
| JP | 2004-003460 A | 1/2004 |
| JP | 2004-201411 A | 7/2004 |
| JP | 2005-140080 A | 6/2005 |
| JP | 2007-125913 A | 5/2007 |
| JP | 2010-030430 A | 2/2010 |
| JP | 2010-095191 A | 4/2010 |
| JP | 2010-111188 A | 5/2010 |

* cited by examiner

*Primary Examiner* — Drew A Dunn
*Assistant Examiner* — Robert Grant
(74) *Attorney, Agent, or Firm* — Edwards Wildman Palmer LLP; Peter F. Corless

(57) ABSTRACT

A method for idle charging of a hybrid vehicle according to an exemplary embodiment of the present invention may include: detecting an SOC of a battery and entering times to an idle charge control state; changing an entering point and a releasing point of the idle charge control according to a number of entering times to the idle charge control state for a predetermined period; performing idle charging by forcibly starting an engine when the SOC of the battery reaches the entering point of the idle charge control; and stopping the engine when the SOC of the battery reaches the releasing point of the idle charge control state as the idle charge is performed.

4 Claims, 3 Drawing Sheets

SYSTEM AND METHOD FOR IDLE CHARGE OF HYBRID VEHICLE

CROSS-REFERENCE TO RELATED APPLICATION

This application claims priority to and the benefit of Korean Patent Application No. 10-2010-0095561 filed in the Korean Intellectual Property Office on Sep. 30, 2010, the entire contents of which are incorporated herein by reference.

BACKGROUND OF THE INVENTION (a) Field of the Invention

The present invention relates to a hybrid vehicle. More particularly, the present invention relates to a system and a method for idle charge of a hybrid vehicle that changes an entering point and a releasing point of idle charge control considering entering times to the idle charge control according to a driving condition.

(b) Description of the Related Art

The hybrid vehicle is provided with an engine such as a gasoline engine or a diesel engine and a motor (motor/generator) generating electricity by using engine output and driven by electricity stored in a battery so as to assist the engine output.

The hybrid vehicle improves fuel economy by using the motor as a main power source or an auxiliary power source at a region where engine efficiency is low, and by generating the electricity through regenerative braking and storing it in the battery during deceleration.

Whether the engine is started or stopped and distribution of torque to the engine and the motor has great influence on fuel economy and drivability of the hybrid vehicle.

Whether the engine is started or stopped and the distribution of the torque to the engine and the motor is determined by various factors including vehicle speed, displacement of an accelerator pedal, and shift speed. The most important factor among them is an SOC (State Of Charge) of a battery.

A method for managing the SOC of the battery is idle charge control in which the engine is started and the motor is operated as the generator so as to raise the SOC of the battery when the SOC of the battery is lowered under a predetermined voltage.

In addition, the SOC of the battery may be maintained at an optimal state by performing the idle charge control efficiently.

According to an idle charge control applied to a conventional hybrid vehicle, SOC value (%) for entering the idle charge control and SOC value (%) for being released from the idle charge control are constant.

For example, the SOC value for entering the idle charge control may be fixedly set as 50% of battery charge, and the SOC value for being released from the idle charge control may be fixedly set as 55% of battery charge.

Therefore, the engine is forcibly started and the idle charge control is performed in a case that the SOC of the battery decreases lower than 50% of the battery charge, and the idle charge control is released in a case that the SOC of the battery increases higher than 55% of the battery charge as the idle charge control is performed.

If the SOC value for entering or being released from the idle charge control is constant, the engine may be started or stopped frequently when the hybrid vehicle runs in congested areas only with the motor (EV mode).

Therefore, a driver may feel a sense of incompatibility and marketability may be deteriorated.

In order to prevent a frequent switch of engine operation, idle charge control region may be enlarged.

For example, the SOC value for entering the idle charge control may be fixedly set as 40% of the battery charge, and the SOC value for being released from the idle charge control may be fixedly set as 70% of the battery charge.

However, a simple enlargement of the idle charge control region may cause unequal distribution of torque to the engine and the motor. Therefore, fuel economy may be deteriorated.

The above information disclosed in this Background section is only for enhancement of understanding of the background of the invention and therefore it may contain information that does not form prior art and/or that is not already known in this country to a person of ordinary skill in the art.

SUMMARY OF THE INVENTION

The present invention has been made in an effort to provide a system and a method for idle charge of a hybrid vehicle having advantages of changing an entering point and a releasing point of an idle charge control state based on a number of entering times to the idle charge control state according to a driving condition.

A system for idle charging of a hybrid vehicle according to an exemplary embodiment of the present invention may include: a state of charge (SOC) detector configured to detect an SOC of a battery that changes according to a driving condition; an idle charge counter configured to count entering times to an idle charge control state; a charging controller configured to variably set an entering point and a releasing point of the idle charge control state based on the SOC of the battery and the counted entering times to the idle charge control state for a predetermined period; and an HSG (Hybrid Start and Generator) operated as a motor so as to forcibly start an engine according to a control of the charging controller and operated as a generator so as to perform idle charging when the engine is started.

The charging controller may forcibly start the engine through the HSG and may perform the idle charge in a case that the SOC of the battery reaches the variably-decided entering point of the idle charge control, and may stop the engine in a case that the SOC of the battery reaches the variably-decided releasing point of the idle charge control.

As the number of times that the vehicle enters the idle charge control during the predetermined period increases, the charging controller lowers the entering point of the idle charge control and raises the releasing point of the idle charge control.

The charging controller can variably set the entering point and the releasing point of the idle control state from a predetermined map.

A method for idle charge of a hybrid vehicle according to another exemplary embodiment of the present invention may include: detecting a state of charge (SOC) of a battery and entering times to idle charge control; changing an entering point and a releasing point of the idle charge control according to the entering times to the idle charge control for a predetermined period; performing idle charging by forcibly starting an engine when the SOC of the battery reaches the entering point of the idle charge control; and stopping the engine when the SOC of the battery reaches the releasing point of the idle charge control as the idle charge is performed.

As the number of times that the vehicle enters the idle charge control during the predetermined period increases, the entering point of the idle charge control is lowered and the releasing point of the idle charge control is set higher.

<Description of symbols>

Figure 1:
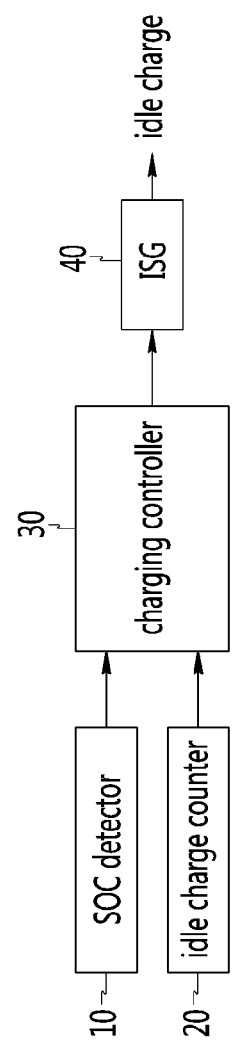
FIG. 1 is a block diagram of a system for idle charge of a hybrid vehicle according to an exemplary embodiment of the present invention.

| 10: SOC detector | 20: idle charge counter |
|---|---|
| 30: charging controller | 40: HSG |

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

FIG. 1 is a block diagram of a system for idle charge of a hybrid vehicle according to an exemplary embodiment of the present invention.

Referring to FIG. 1, a system for idle charge of a hybrid vehicle according to an exemplary embodiment of the present invention includes an SOC detector 10, an idle charge counter 20, a charging controller 30, and an HSG (Hybrid Start and Generator) 40.

The SOC detector 10 detects an SOC of a battery that changes according to a driving condition and transmits information corresponding thereto to the charging controller 30.

The idle charge counter 20 counts entering times to the idle charge control according to the driving condition and transmits information corresponding thereto to the charging controller 30.

The charging controller 30 sets an entering point and a releasing point of the idle charge control based on the SOC of the battery received from the SOC detector 10 and the entering times to the idle charge control for a predetermined period received from the idle charge counter 20.

The charging controller 30 starts the engine and performs the idle charge through the HSG 40 if the SOC of the battery reaches the variably-decided entering point of the idle charge control, and stops the engine and releases the idle charge if the SOC of the battery reaches the variably-decided releasing point of the idle charge control.

As the number of times that the vehicle enters the idle charge control during the predetermined period increases, the charging controller 30 lowers the entering point of the idle charge control and raises the releasing point of the idle charge control.

That is, the charging controller 30 enlarges an idle charge control region.

The HSG (Hybrid Start and Generator) 40 is operated as a motor and starts the engine forcibly according to the control of the charging controller 30, and is operated as a generator and performs the idle charge by torque of the engine if the engine is started.

A method for idle charge of a hybrid vehicle according to an exemplary embodiment of the present invention will be described in detail.

Figure 2:
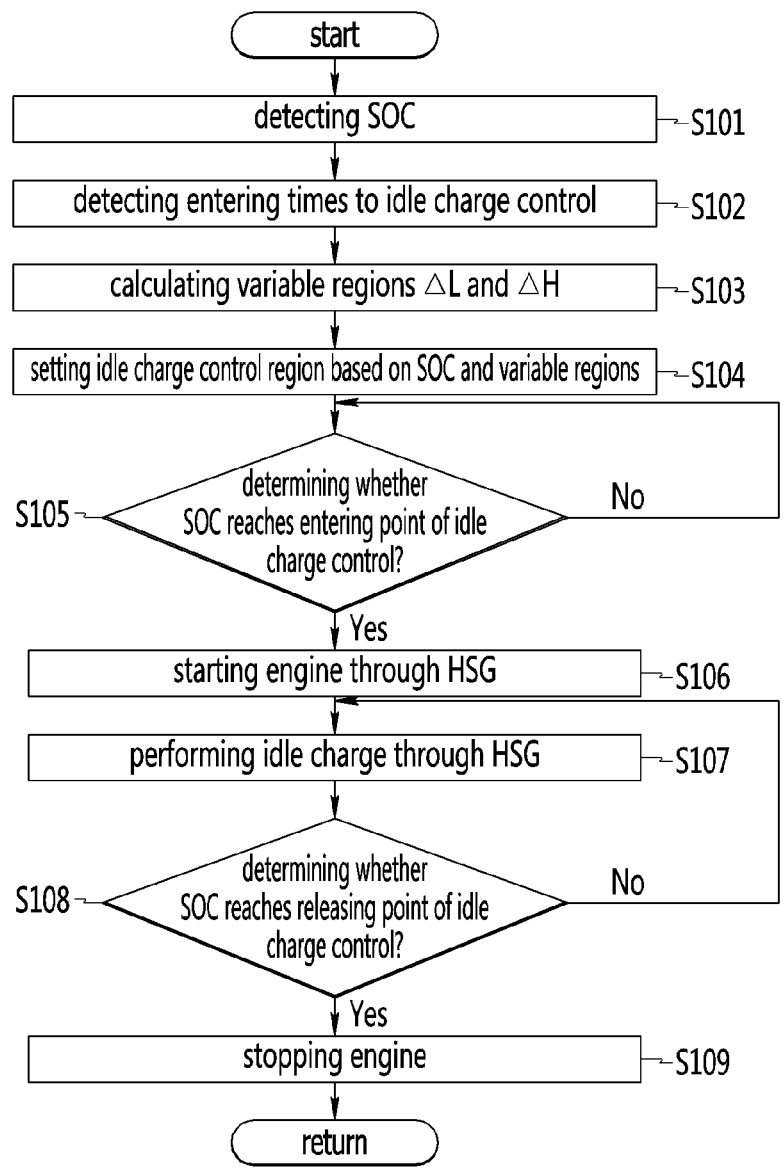
FIG. 2 is a flowchart of a method for idle charge of a hybrid vehicle according to an exemplary embodiment of the present invention.

FIG. 2 is a flowchart of a method for idle charge of a hybrid vehicle according to an exemplary embodiment of the present invention.

In a state that the hybrid vehicle to which an exemplary embodiment of the present invention is applied is running, the charging controller 30 detects the SOC of the battery through the SOC detector 10 at a step S101, and detects the entering times to the idle charge control for the predetermined period according to the driving condition through the idle charge counter 20 at a step S102.

After that, the charging controller 30 calculates minimum and maximum variable regions $\Delta L$ and $\Delta H$ according to the entering times to the idle charge control for predetermined period at a step S103, and sets the idle charge control region based on the SOC of the battery and the variable regions $\Delta L$ and $\Delta H$ calculated according to the entering times to the idle charge control at a step S104.

If the idle charge control region is set at the step S104, the charging controller 30 determines whether the SOC of the battery reaches the entering point of the idle charge control at a step S105.

If the SOC of the battery reaches to the entering point of the idle charge control at the step S105, the charging controller 30 starts the engine forcibly through the HSG 40 at a step S106.

If the engine is started at the step S106, the HSG 40 is operated as the generator and generates electricity by the torque of the engine. Therefore, the HSG 40 performs the idle charge at a step S107.

After that, the charging controller 30 determines whether the SOC of the battery reaches the releasing point of the idle charge control decided from the entering times to the idle charge control at a step S108.

If the releasing point of the idle charge control is reached at the step S108, the charging controller 30 stops the engine and completes the idle charge at a step S109.

Figure 3:
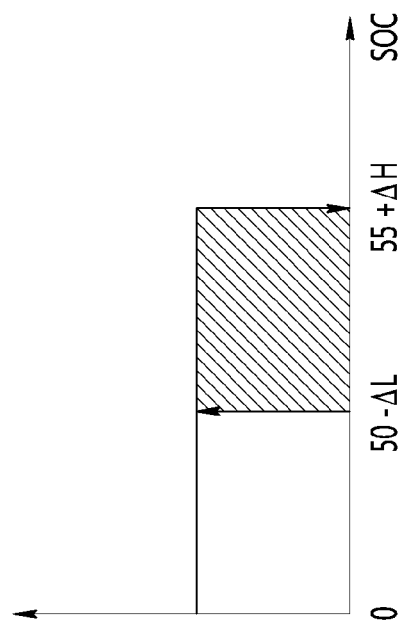
FIG. 3 is a graph showing an idle charge region applied to a method for idle charge of a hybrid vehicle according to an exemplary embodiment of the present invention.

Referring to FIG. 3, a method for idle charge of a hybrid vehicle according to an exemplary embodiment of the present invention will be described in further detail. One example of the entering point of the idle charge control and the releasing point of the idle charge control is shown in this specification, but the scope of the present invention is not limited to this.

As shown in FIG. 3, an initial entering point of the idle charge control is set as 50% of a maximum SOC of the battery, and an initial releasing point of the idle charge control is set as 55% of the maximum SOC of the battery.

If the SOC of the battery detected by the SOC detector 10 is lower than 50% of the maximum SOC of the battery which is the entering point of the idle charge control when the hybrid vehicle runs at an EV mode, the charging controller 30 controls the HSG 40 so as to start the engine forcibly and operates the HSG 40 as the generator so as to perform the idle charge.

If the SOC of the battery exceeds the 55% of the maximum SOC of the battery which is the releasing point of the idle charge control through the idle charge, the charging controller 30 stops the engine and is released from the idle charge control.

At this time, the charging controller 30 counts the entering times to the idle charge control, and sets the variable regions ΔL and ΔH for entering and being released from the idle charge control by applying the entering times to the idle charge control for the predetermined period to the predetermined map.

For example, if the entering times to the idle charge control for the predetermined period is 2, the variable regions are set as ΔL=5 and ΔH=5 from the predetermined map.

Therefore, the entering point of the idle charge control is changed to 50−ΔL of the maximum SOC of the battery (i.e., 45% of the maximum SOC of the battery), and the releasing point of the idle charge control is changed to 55+ΔH of the maximum SOC of the battery (i.e., 60% of the maximum SOC of the battery).

After that, the charging controller 30 starts the engine forcibly and enters the idle charge control if the SOC of the battery is lower than 45% of the maximum SOC of the battery. The charging controller 30 stops the engine and releases the idle charge control if the SOC of the battery is higher than 60% of the maximum SOC of the battery.

Meanwhile, as the frequency of entry into the idle charge control within the predetermined period increases, the variable regions expand become and the changes in the engine states become less frequent.

As described above, since the entering point and the releasing point of the idle charge control are changed, the frequency change of the engine states is reduced. Therefore, a driver may not feel a sense of incompatibility and marketability may improve according to an exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for idle charging of a hybrid vehicle, comprising:
   a state of charge (SOC) detector configured to detect an SOC of a battery that changes according to a driving condition;
   an idle charge counter configured to count a number of entering times to an idle charge control state, wherein the number of entering times are the number of times that the hybrid vehicle enters the idle charge control state in a predetermined period of time;
   a charging controller configured to variably set an entering point and a releasing point of the idle charge control state based on the SOC of the battery and the counted entering times to the idle charge control during the predetermined period of time, wherein as the number of times that the hybrid vehicle enters the idle charge control state during the predetermined period increases, the charging controller lowers the entering point of the idle charge control state and raises the releasing point of the idle charge control state; and
   a hybrid shaft generator (HSG) operated as a motor so as to forcibly start an engine according to a control of the charging controller and operated as a generator so as to perform idle charging when the engine is started.

2. The system of claim 1, wherein the charging controller forcibly starts the engine through the HSG and performs idle charging when the SOC of the battery reaches the variably-decided entering point of the idle charge control state and stops the engine when the SOC of the battery reaches the variably-decided releasing point of the idle charge control state.

3. The system of claim 1, wherein the charging controller variably sets the entering point and the releasing point of the idle control state from a predetermined map.

4. A method for idle charging of a hybrid vehicle, the method comprising:
   detecting, by a detector, a state of charge (SOC) of a battery;
   counting, by a counter, a number of entering times to an idle charge control state, wherein the number of entering times are the number of times that the hybrid vehicles enters the idle charge control state;
   changing, by a controller, an entering point and a releasing point of the idle charge control state according to the number of times the hybrid vehicles enters the idle charge control state during a predetermined period of time wherein as the number of times the vehicle enters the idle charge control state for the predetermined period increases, the entering point of the idle charge control state lowered and the releasing point of the idle charge control raised;
   controlling, by the controller, a motor to forcibly start an engine to perform idle charging when the SOC of the battery reaches the entering point of the idle charge control state; and
   stopping, by the controller, the engine when the SOC of the battery reaches the releasing point of the idle charge control state as the idle charge is performed.

\* \* \* \* \*